(12) United States Patent
Onnen et al.

(10) Patent No.: US 6,478,714 B2
(45) Date of Patent: Nov. 12, 2002

(54) DEVICE FOR CONTROLLING AN INTERNAL COMBUSTION ENGINE DRIVING A UTILITY UNIT

(75) Inventors: Christian Onnen, Esslingen (DE); Wolfram Schmid, Nürtingen (DE)

(73) Assignee: DaimlerChrysler A.G., Stuttgart (DE)

( * ) Notice: Subject to any disclaimer, the term of this patent is extended or adjusted under 35 U.S.C. 154(b) by 0 days.

(21) Appl. No.: 09/939,215

(22) Filed: Aug. 24, 2001

(65) Prior Publication Data

US 2002/0023621 A1 Feb. 28, 2002

(30) Foreign Application Priority Data

Aug. 24, 2000 (DE) .......................................... 100 41 679

(51) Int. Cl.⁷ .............................................. B60K 41/04
(52) U.S. Cl. ...................................................... 477/107
(58) Field of Search ................................. 723/350, 352; 123/357, 2; 417/364; 477/107

(56) References Cited

U.S. PATENT DOCUMENTS 6,104,976 A * 8/2000 Nakamura .................... 701/95

FOREIGN PATENT DOCUMENTS

EP      OS 0 736 708      10/1996

* cited by examiner

*Primary Examiner*—Dirk Wright
(74) *Attorney, Agent, or Firm*—Klaus J. Bach

(57) ABSTRACT

In a device for controlling the speed of an internal combustion engine driving a utility unit with a speed control circuit for the internal combustion engine and with a load control circuit for the utility unit, the device includes sensors and an evaluation unit for detecting and evaluating the state of the system as a whole, and an arrangement for an intervention in the speed control circuit and/or the load control circuit depending on critical relevant system states in order to achieve a reduction in the system complexity and thus a better control of the dynamics of the system as a whole.

17 Claims, 2 Drawing Sheets

DEVICE FOR CONTROLLING AN INTERNAL COMBUSTION ENGINE DRIVING A UTILITY UNIT

BACKGROUND OF THE INVENTION

Figure 1:
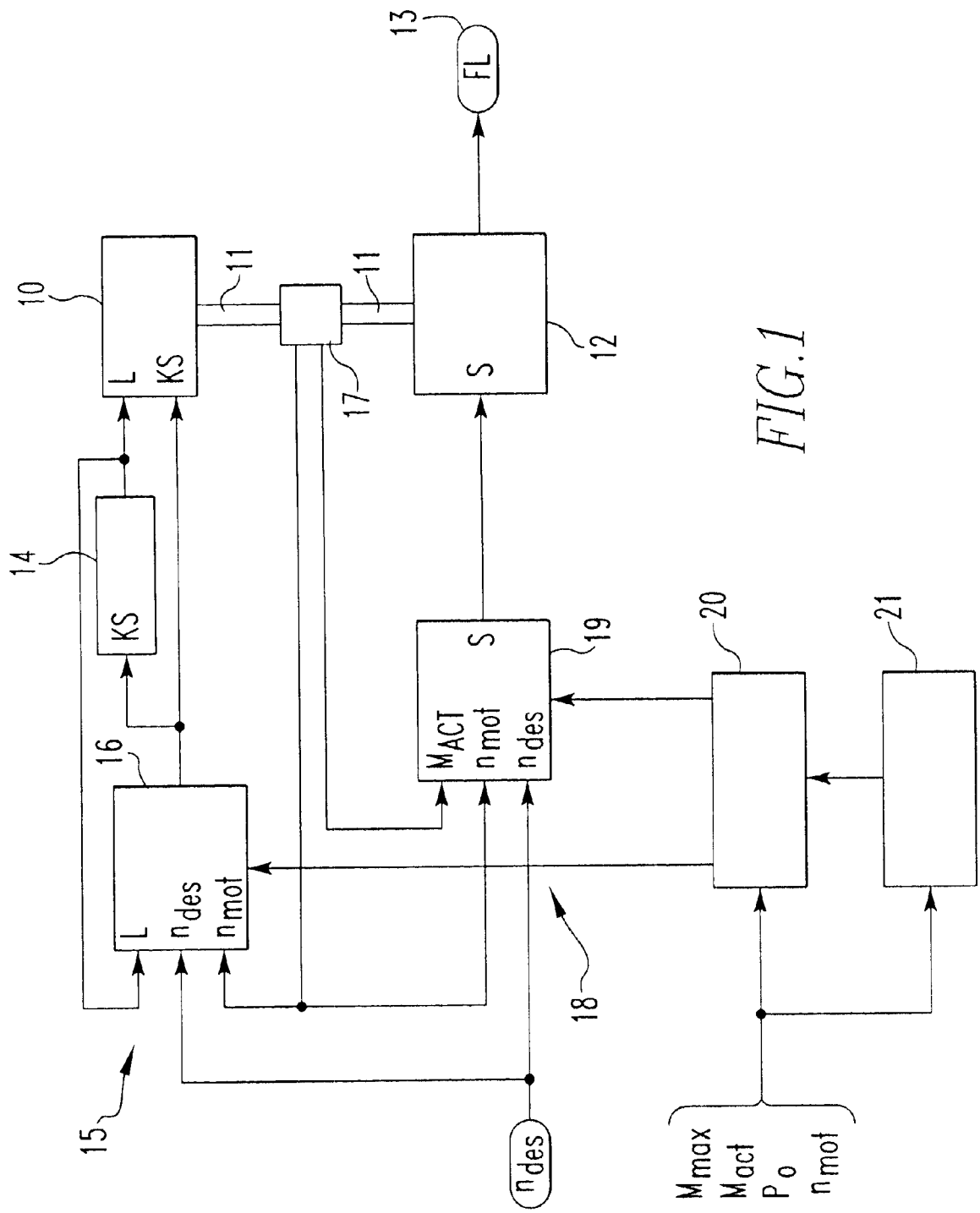

The invention relates to a device for controlling an internal combustion engine driving a utility unit, with a speed control circuit for the internal combustion engine and with a load control circuit for the utility unit.

In particular when a load on the utility unit changes as a function of the engine speed, which speed also represents a controlled variable of the speed control circuit for the internal combustion engine, the two control circuits are coupled by the common controlled variable representing the engine speed. Under certain conditions, this coupling results in interactions which can lead to an unstable behavior of the system as a whole. In such known devices, in which the control circuits have only common information available via a particular reference variable or a controlled variable, no operating condition-defining variables are analyzed.

An internal combustion engine mechanically coupled to a hydraulic pump is known from EP 0 736 708 A1, wherein the displaced volume of the hydraulic pump is adjusted proportionally to the speed of the drive engine. This takes place via a mechanically coupled control valve. System-critical or dynamically relevant state constellations cannot be taken into account in this known device, and no control intervention in an electronic control circuit is possible.

It is an object of the present invention to provide a device with which, in an internal combustion engine/utility unit system, the control circuits for the speed of the internal combustion engine and the unit load can be decoupled according to particular requirements upon the occurrence of system-critical and dynamically relevant signal and state constellations.

SUMMARY OF THE INVENTION

The device according to the invention provides for a reduction in the system complexity and thus a better control of the dynamics of the system as a whole is achieved by virtue of the state-dependent task separation or decoupled control. Unstable system states can be avoided by specific intervention in particular in the load control circuit but if required in the speed control circuit as well. For example, the control on the utility unit side can be deactivated in during temporary engine output limitation, so that the internal combustion engine has the opportunity to build the necessary torque up again while loading remains unchanged. After this unsteady operating phase has ended, the control of the utility unit is enabled again.

Such interventions are preferably changes in controller parameters and/or activations, deactivations or restrictions of at least one of the control circuits. In this connection, the intervention means are designed above all and essentially for intervention in the load control circuit. However, interventions in the speed control circuit are also possible.

In a preferred application, the intervention means can be activated on temporary output limitations of the internal combustion engine. Then, preferably, an intervention in the load control circuit is performed.

The engine speed preferably serves as the reference variable and controlled variable for both control circuits.

In an advantageous embodiment, at least the input variables engine speed, maximum engine torque and actual engine torque, and preferably also the input variable ambient pressure, are applied to the means for detecting and evaluating the system state. From these variables, preferably at least two of the system states, that is, full output, temporarily restricted output and unrestricted output states are then detected and evaluated.

Comparison arrangements for comparing the maximum possible engine torque with the instantaneous full-load value and/or for comparing the maximum possible engine torque with the actual engine torque value preferably serve for evaluation. In this connection, an evaluating arrangement for the results of the comparison serves for detecting the different system states, depending on which the interventions in the control circuit(s) in turn take place.

Any simultaneous meeting of a number of decision conditions is excluded in an advantageous manner by a prioritization arrangement.

In a preferred application, the internal combustion engine is designed as a supercharged internal combustion engine, in particular as a diesel engine, and the utility unit can be a mechanical or hydromechanical gearing or a converter or a hydraulic pump.

The invention will become more readily apparent from the following description of a preferred embodiment thereof described below on the basis of the accompanying drawings.

BRIEF DESCRIPTION OF THE DRAINGS

Figure 2:
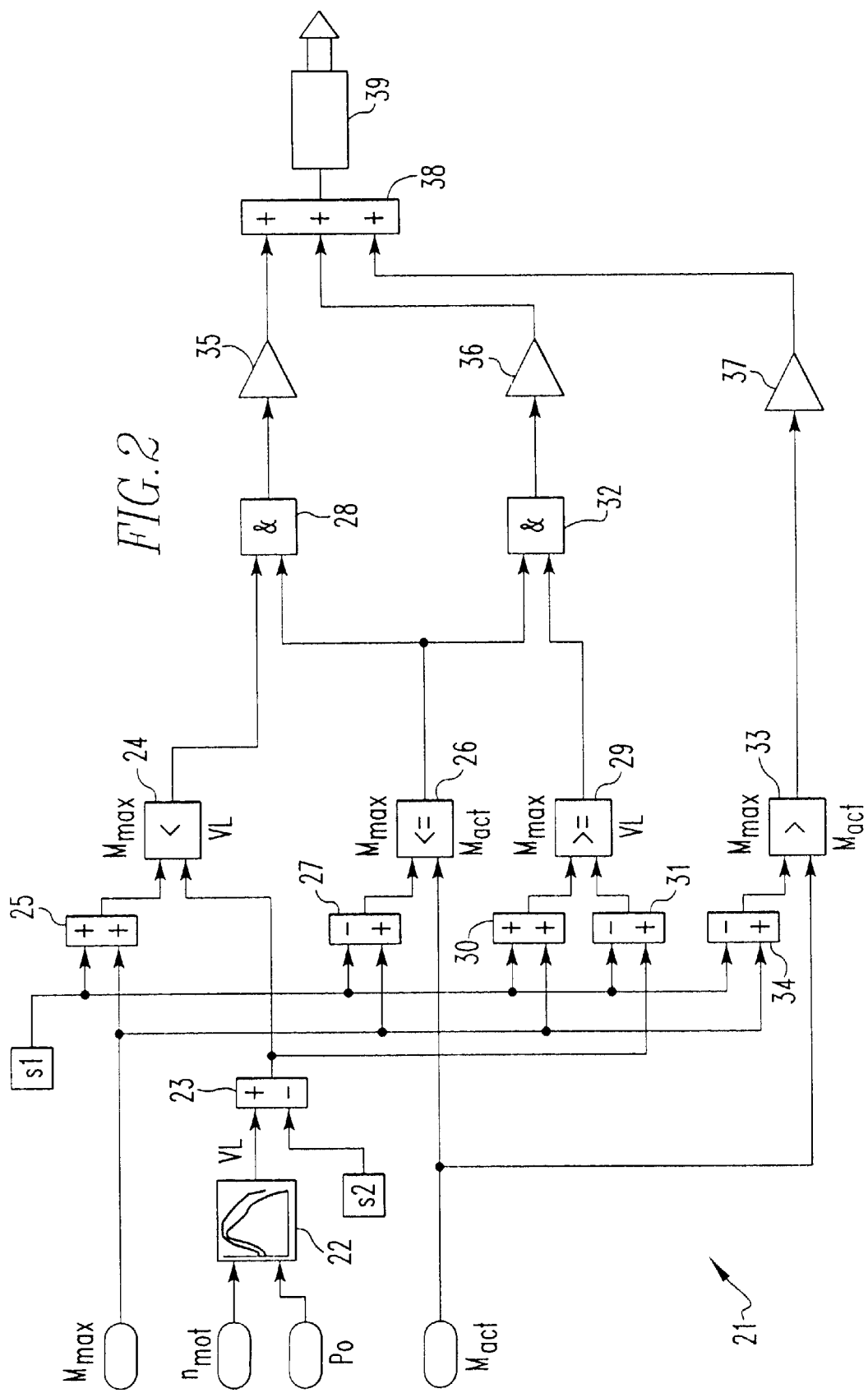

FIG. 1 shows a block illustration of a device for con trolling the speed of an internal combustion engine driving a utility unit as an illustrative embodiment of the invention, and FIG. 2 shows a detailed circuit for detecting and evaluating the system state.

The block diagram according to FIG. 1 shows an internal combustion engine 10 which drives a hydraulic pump 12 via a drive train 11. The hydraulic pump 12 is, for example, part of a hydrostatic gearing, by means of which one or more hydraulic motors for the propulsion of a vehicle (not illustrated) are driven. The driving power FL generated on the output side is illustrated diagrammatically by a symbol 13.

In the illustrative embodiment, the internal combustion engine 10 is a diesel engine supercharged by a turbocharger 14. In principle, other supercharged or normally aspirated internal combustion engines can also be used within the scope of the invention. Such an internal combustion engine 10 can also drive one or more utility units instead of a hydraulic pump 12, for example a mechanical or hydromechanical gearing or another converter.

A first control circuit for the internal combustion engine 10, designed as a speed control circuit 15, consists essentially of an electronic controller unit or an electronic controller 16, the input side of which is supplied with a desired speed value ndes and an engine speed value $n_{mot}$ as the actual value. The engine speed value $n_{mot}$ is detected by a sensor device 17 on the drive train 11, but can also be detected elsewhere, as the internal combustion engine 10 and the hydraulic pump 12 have the same speed as a consequence of being coupled by the drive train 11. Furthermore, in the electronic controller 16, various actual charger values L of the turbocharger 14 are supplied, for example the charge air temperature, the charger air pressure and the like.

On the output side, the controller 16 generates manipulated variables KS for the turbocharger 14 and the internal combustion engine 10, for example desired values for the fuel proportioning or the delivery angle. From the turbocharger 14, its output variables, in other words, for example, a given charger air pressure and a given charge air temperature, are applied to the internal combustion engine 10.

By means of this speed control circuit 15, the turbocharger and the internal combustion engine 10 are controlled to the desired speed $n_{des}$ by appropriate fuel quantities supplied.

A second control circuit, designed as a load control circuit 18 for the hydraulic pump 12, in turn consists essentially of an electronic controller 19, which is in turn supplied with the desired speed value $n_{des}$ and the engine speed value $n_{mot}$ as the actual value. In addition, the actual engine torque $M_{act}$ detected in the sensor device 17 is also supplied to this controller 19.

Depending on these input variables, the controller 19 generates a manipulated variable S on the output side for the pump geometry of the hydraulic pump 12 for controlling the speed-dependent and speed-difference-dependent power requirements of the hydraulic pump 12.

An electronic intervention arrangement 20, by means of which it is possible to intervene in the two control circuits 15, 18, serves for decoupling the two control circuits 15, 18 in system-critical and dynamically relevant signal and state constellations. Such interventions consist of, for example, changes in controller parameters and/or activations, deactivations or restrictions of one or both control circuit(s). In this way, decoupling of the two control circuits is brought about in system-critical and dynamically relevant signal and state constellations, in order to afford better control of the dynamics of the system as a whole. Unstable system states can be avoided by specific interventions in the control circuits, in particular in the load control circuit 18.

The decision and evaluation with regard to whether such an intervention is necessary takes place in a system state evaluation arrangement 21 which is illustrated in greater detail in FIG. 2. The maximum possible engine torque $M_{max}$, the actual engine torque value $M_{act}$, the ambient pressure $P_o$ and the actual engine speed value $n_{mot}$ are supplied as input variables to the intervention arrangement 20 and the system state evaluation arrangement 21. These variables are in some cases detected by sensor arrangements and in some cases formed in electronic control arrangements using algorithms or characteristics, as is the case, for example, with the maximum engine torque $M_{max}$. These variables can be supplied via, for example, bus lines.

In the system state evaluation arrangement 21 illustrated in greater detail in FIG. 2, the instantaneous load or full load VL is determined from the engine speed value $n_{mot}$ and the ambient pressure $p_o$. This value can of course also be established externally and then supplied as such. In a downstream subtracting stage 23, a correction of the full-load value VL is performed by means of a stored tolerance value s2. In a first comparison stage 24, the corrected full-load value VL is then compared with the maximum possible engine torque $M_{max}$, a tolerance value s1 having previously been applied to $M_{max}$ in a summing stage 25, so that this tolerance is taken into account in the subsequent comparison. The first comparison stage 24 then generates an output signal when $M_{max}$ is smaller than VL, in other words when the maximum full-load state is present.

In a second comparison stage 26, a check is carried out of whether the maximum possible torque $M_{max}$ is smaller than or equal to the actual engine torque value $M_{act}$, in other words whether the actual engine torque is at the instantaneous upper limit, or whether an instantaneous full-load state is present. The tolerance value s1 is likewise previously applied to the maximum possible engine torque $M_{max}$ in a subtracting stage 27. If both comparison stages 24, 26 generate an output signal, it is established via an And element 28 that the internal combustion engine 10 is delivering full output.

By means of a third comparison stage 29, a check is carried out of whether the maximum possible engine torque $M_{max}$ is greater than or equal to the calculated full-load value. The tolerance value s1 is previously applied to the value $M_{max}$ in an adding stage 30 and to the full-load value VL in a subtracting stage 31. The two output signals of the second and third comparison stages 26, 29 are linked in an And element 32, an output signal of this And element 32 indicating that the output of the internal combustion engine 10 is temporarily restricted by limitations applied.

Lastly, by means of a fourth comparison stage 33, a check is carried out of whether the maximum possible engine torque $M_{max}$ is greater than the actual engine torque $M_{act}$. In this case too, the tolerance value s1 is applied to the value $M_{max}$ in a subtracting stage 34. An output signal of the comparison stage 33 indicates that the internal combustion engine 10 is working in an unrestricted state in the part-load operating mode.

The three operatingstate signals produced are amplified by amplification stages 35 to 37. The same or different amplification factors may be used herefor. The amplified signals are then linked with a summation signal in a summing stage 38. In the event that a number of decision conditions coincide, a downstream prioritization stage 39 decides on the priority of the interventions to be carried out in one or in both control circuits 15, 18. These interventions and the operations initiating them can be very different and complex.

For example, the load control circuit 18 can be deactivated in the state of a temporary engine output limitation, so that the internal combustion engine has the opportunity to build up the necessary torque while loading remains unchanged. After this unsteady operating phase has ended, the control for the hydraulic pump 12 by means of the load control circuit 18 is enabled again. In particular in the case of abruptly changing loading of the hydraulic pump 12, speed and load oscillations in the system as a whole could occur in strongly linked controls, which oscillations can be avoided or at least reduced by the interventions described. If, on the other hand, in the full-load state of the internal combustion engine 10, for example, a torque requirement on the part of the hydraulic pump 12 arises, either no intervention in the control takes place or, in the event of an abrupt torque requirement, the effects can be lessened by intervention in the control parameters.

What is claimed is:

1. A device for controlling a system including an internal combustion engine driving a utility unit, with a speed control circuit for the internal combustion engine, with a load control circuit for the utility unit, means for detecting and evaluating the state of the system as a whole, and intervention means for intervention in at least one of the speed control circuit and the load control circuit depending on system-critical and dynamically relevant system states.

2. A device according to claim 1, wherein the interventions are changes in controller parameters and activations, deactivations and restrictions of at least one of the control circuits.

3. A device according to claim 1, wherein the intervention means are designed essentially for intervention in the load control circuit.

4. A device according to claim 3, wherein the intervention means are designed to be activated during temporary output limitations of the internal combustion engine.

5. A device according to claim 1, wherein the engine speed serves as a reference variable and a controlled variable for both control circuits.

6. A device according to claim 1, wherein at least the input variables engine speed ($n_{mot}$), maximum possible engine torque ($M_{max}$) and actual engine torque value ($M_{act}$), and also the ambient pressure ($p_o$), are applied to the means for detecting and evaluating the system state.

7. A device according to claim 1, wherein the means for detecting and evaluating the system state are designed for detecting at least full output, temporarily restricted output and unrestricted output state during part-load operation.

8. A device according to claim 1, wherein the means for detecting and evaluating the system state include a comparison arrangement for comparing maximum possible engine torque ($M_{max}$) with an instantaneous full-load value (VL).

9. A device according to claim 1, wherein the means for detecting and evaluating the system state include a comparison arrangement for comparing the maximum possible engine torque ($M_{max}$) with the actual engine torque value ($M_{act}$).

10. A device according to claim 8, wherein an evaluation arrangement is provided for evaluating the results of the comparison for a detection of different system states.

11. A device according to claim 9, wherein an evaluation arrangement is provided for evaluating the results of the comparison for a detection of different system states.

12. A device according to claim 10, wherein the evaluation arrangement includes a prioritization arrangement.

13. A device according to claim 11, wherein the evaluation arrangement includes a prioritization arrangement.

14. A device according to claim 1, wherein the internal combustion engine is a supercharged internal combustion engine, in particular a diesel engine.

15. A device according to claim 14, wherein the supercharged internal combustion engine is a diesel engine.

16. A device according to claim 1, wherein the utility unit is one of a mechanical transmission, a hydromechanical transmission, a converter and a hydraulic pump.

17. A device according to claim 16, wherein the load control circuit is operationally connected to an adjusting device for the pump geometry of the hydraulic pump which is a component of a hydrostatic transmission for the propulsion of a vehicle.

* * * * *